(12) United States Patent
Wilde et al.

(10) Patent No.: US 6,298,027 B1
(45) Date of Patent: Oct. 2, 2001

(54) LOW-BIREFRINGENCE OPTICAL FIBER FOR USE IN AN OPTICAL DATA STORAGE SYSTEM

(75) Inventors: Jeffrey P. Wilde, Los Gatos; Jerry E Hurst, Jr.; John F. Heanue, both of San Jose, all of CA (US); Viatcheslav Izraelian, North York (CA); Alexander Tselikov, Fremont, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/124,812

(22) Filed: Jul. 29, 1998

Related U.S. Application Data

(60) Provisional application No. 60/079,903, filed on Mar. 30, 1998, and provisional application No. 60/088,192, filed on Jun. 5, 1998.

(51) Int. Cl.[7] .................................................... G11B 7/00
(52) U.S. Cl. ............................ 369/112.02; 369/112.17; 369/112.27
(58) Field of Search ........................... 369/110, 112, 369/109, 44.23, 44.24

(56) References Cited

U.S. PATENT DOCUMENTS

| | | | |
|---|---|---|---|
| 3,659,915 | 5/1972 | Maurer et al. | 350/96 |
| 3,737,236 | 6/1973 | Borrelli | 356/118 |
| 3,859,643 | 1/1975 | Borrelli | 340/174 |
| 3,942,867 | 3/1976 | Ono | 350/96 |
| 4,135,083 | 1/1979 | Van Alem et al. | 250/201 |
| 4,298,245 | 11/1981 | Aulich et al. | 350/96.29 |
| 4,337,531 | 6/1982 | Willemsen | 369/45 |
| 4,368,946 | 1/1983 | Kaneko et al. | 350/3.78 |
| 4,460,989 | 7/1984 | Russell | 369/45 |
| 4,581,529 | 4/1986 | Gordon | 250/227 |
| 4,626,066 | 12/1986 | Levinson | 350/96.18 |
| 4,626,679 | 12/1986 | Kuwayama et al. | 250/227 |
| 4,638,153 | 1/1987 | Dakin | 250/227 |
| 4,737,005 | 4/1988 | Burns et al. | 350/96.15 |
| 4,866,372 | 9/1989 | Aoshima et al. | 324/96 |
| 4,978,190 | 12/1990 | Veith | 350/96.18 |
| 5,033,043 | 7/1991 | Hayakawa | 369/121 |
| 5,093,884 | 3/1992 | Gidon et al. | 385/132 |
| 5,119,361 | 6/1992 | Tanabe | 369/121 |
| 5,120,953 | 6/1992 | Harris | 250/227.2 |

(List continued on next page.)

FOREIGN PATENT DOCUMENTS

| | | |
|---|---|---|
| 0 582 405 A1 | 2/1994 | (EP) . |
| 01169746 | 7/1989 | (JP) . |
| 09297931 | 11/1997 | (JP) . |
| WO 98/07060 | 8/1996 | (WO) . |
| 98/09280 | 3/1998 | (WO) . |
| 98/09285 | 3/1998 | (WO) . |
| 98/09289 | 3/1998 | (WO) . |

OTHER PUBLICATIONS

"Single–mode nonlinear–optical polymer fibers", D.W. Garvey et al., *J.Opt.Soc.Am.B*, vol. 13, No. 9, Sep. 1996.
"Micromachined 1X2 Optical Fiber Switch", Leslie A. Field et al., *Transducers '95* (Jun. 25, 1995).
"Use of optical fiber heads for optical disks", Frank S. Barnes et al., *Applied Optics*, vol. 25, No. 22, Nov. 15, 1986.
"Optical fibers for magneto–optical recording", Michael Opsasnick et al., *Optical Data Sotrage '91*, SPIE vol. 1499.

*Primary Examiner*—Nabil Hindi
(74) *Attorney, Agent, or Firm*—Thomason, Moser, & Patterson, L.L.P.

(57) ABSTRACT

An optical data storage system 100 utilizes optical fibers 102 for transfer of information to and from storage media 107. The storage media 107 comprises magneto-optical storage disks. The optical fibers 102 are low-birefringence optical fibers. As compared to the prior art, a polarization state conveyed by the optical fiber 102 is accurately reproduced with reduced noise.

3 Claims, 8 Drawing Sheets

U.S. PATENT DOCUMENTS

| | | | |
|---|---|---|---|
| 5,137,359 | 8/1992 | Steele | 356/350 |
| 5,152,597 | 10/1992 | Barnard | 359/130 |
| 5,172,369 | 12/1992 | Chikuma et al. | 369/112 |
| 5,191,387 | 3/1993 | Ichikawa et al. | 356/34 |
| 5,218,582 | 6/1993 | Marchant | 369/14 |
| 5,229,834 | 7/1993 | Lequime | 356/365 |
| 5,245,491 | 9/1993 | Horie et al. | 360/114 |
| 5,347,297 | 9/1994 | Gage | 346/108 |
| 5,389,779 | 2/1995 | Betzig et al. | 250/216 |
| 5,483,607 | 1/1996 | O'Keefe | 385/11 |
| 5,535,189 | 7/1996 | Alon et al. | 369/102 |
| 5,546,482 | 8/1996 | Cordova et al. | 385/12 |
| 5,748,603 * | 5/1998 | Kim et al. | 369/110 |
| 5,831,942 * | 11/1998 | Morimoto et al. | 369/110 |
| 5,835,458 * | 11/1998 | Bischel et al. | 369/44.12 |
| 5,850,375 * | 12/1998 | Wilde et al. | 369/112 |
| 6,034,938 * | 3/2000 | Heanue et al. | 369/13 |

* cited by examiner

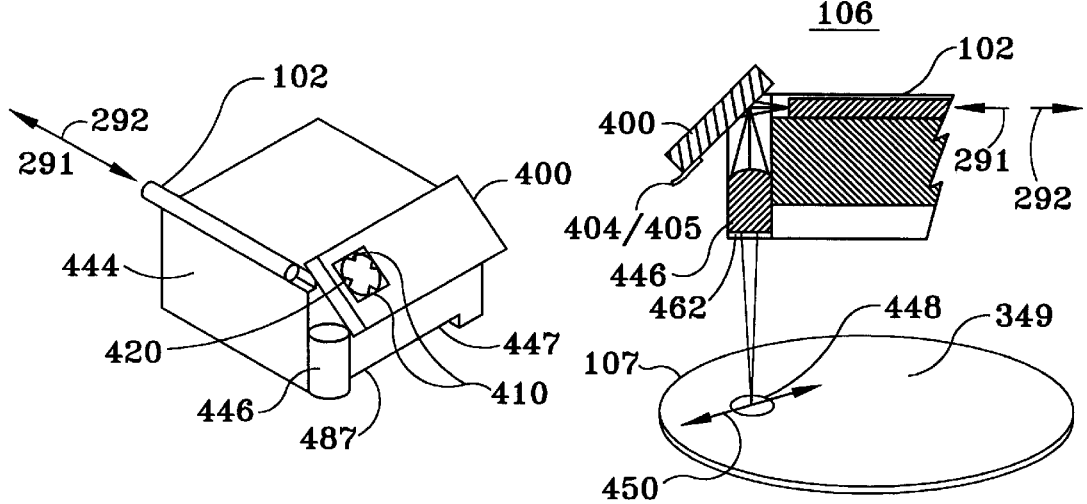
Fig. 4a
Fig. 4b
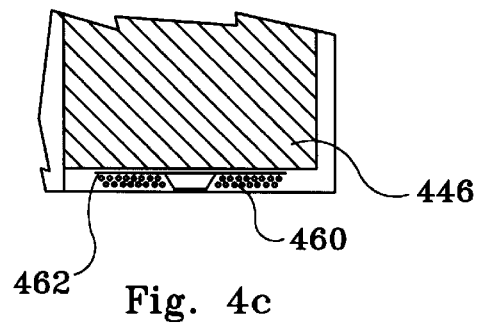
Fig. 4c
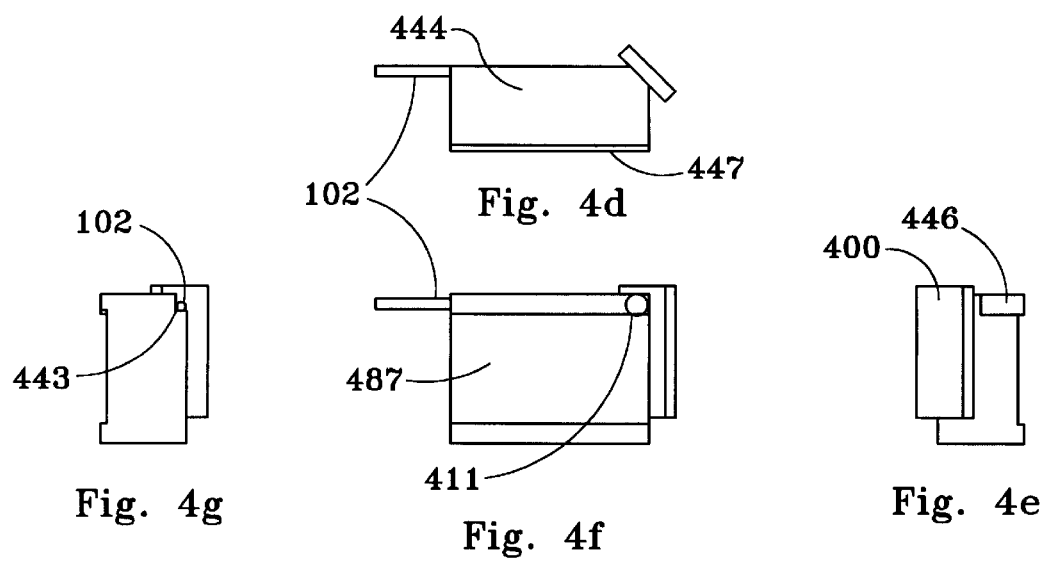
Fig. 4g
Fig. 4d
Fig. 4f
Prior Art
Fig. 4e

LOW-BIREFRINGENCE OPTICAL FIBER FOR USE IN AN OPTICAL DATA STORAGE SYSTEM

RELATED APPLICATIONS

The present invention is related to and claims priority from U.S. Provisional Applications 60/079,903 entitled "Optical Drive Utilizing Low Birefringence Fiber," filed Mar. 30, 1998 and 60/088,192 entitled "Laser Phase Noise Minimization In Optical Drive," filed Jun. 5, 1998, which are incorporated herein by reference.

BACKGROUND OF THE INVENTION

1. Field of the Invention

The present invention relates generally to optical fiber for use in data storage systems. More particularly, the present invention relates to low-birefringence optical fibers in optical data storage systems.

2. Background Art

In a magneto-optical storage system, using a magneto-optical (MO) recording material deposited on a rotating disk, information may be recorded on the disk as spatial variations of magnetic domains. During readout, a magnetic domain pattern modulates an optical polarization, and a detection system converts a resulting signal from optical to electronic format.

In one type of a magneto-optical storage system, a magneto-optical head assembly is located on a linear actuator that moves the head along a radial direction of the disk to position the optical head assembly over data tracks during recording and readout. A magnetic coil is placed on a separate assembly on the head assembly to create a magnetic field that has a magnetic component in a direction perpendicular to the disk surface. A vertical magnetization of polarity, opposite to that of the surrounding magnetic material of the disk medium, is recorded as a mark indicating zero or a one by first focusing a beam of laser light to form an optical spot on the disk. The optical spot functions to heat the magneto-optical material to a temperature near or above a Curie point (a temperature at which the magnetization may be readily altered with an applied magnetic field). A current passed through the magnetic coil orients the spontaneous vertical magnetization either up or down. This orientation process occurs in the region of the optical spot where the temperature is suitably high. The orientation of the magnetization mark is preserved after the laser beam is removed. The mark is erased or overwritten if it is locally reheated to the Curie point by the laser beam during a time the magnetic coil creates a magnetic field in the opposite direction.

Information is read back from a particular mark of interest on the disk by taking advantage of the magnetic Kerr effect so as to detect a Kerr rotation of the optical polarization that is imposed on a reflected beam by the magnetization at the mark of interest. The magnitude of the Kerr rotation is determined by the material's properties (embodied in the Kerr coefficient). The sense of the rotation is measured by established differential detection schemes and, depending on the direction of the spontaneous magnetization at the mark of interest, is oriented clockwise or counter-clockwise.

Conventional magneto-optical heads, while presently providing access to magneto-optical disks with areal densities on the order of 1 Gigabit/in$^2$, tend to be based on relatively large optical assemblies which make the physical size and mass of the head rather bulky (typically 3–15 mm in a dimension). Consequently, the speed at which prior art magneto-optical heads are mechanically moved to access new data tracks on a magneto-optical storage disk is slow. Additionally, the physical size of the prior art magneto-optical heads limits the spacing between magneto-optical disks. Because the volume available in standard height disk drives is limited, magneto-optical disk drives have, thus, not been available as high capacity commercial products. For example, a commercial magneto-optical storage device presently available provides access to only one side of a 130 mm double sided 2.6 ISO gigabyte magneto-optical disk, a 40 ms disk access time, and a data transfer rate of 4.6 MB/Sec.

N. Yamada (U.S. Pat. No. 5,255,260) discloses a low-profile flying optical head for accessing an upper and lower surface of a plurality of optical disks. The flying optical head disclosed by Yamada describes an actuating arm that has a static (fixed relative to the arm) mirror or prism mounted thereon, for delivering light to and receiving light from a phase-change optical disk. While the static optics described by Yamada provides access to both surfaces of a plurality of phase-change optical disks contained within a fixed volume, Yamada is limited by the size and mass of the optics. Consequently, the performance and the number of optical disks that can be manufactured to function within a given volume is also limited. Utilization of optical fibers to deliver light to a storage location within an optical disk drive allows a low profile optical path which can increase the number of disks that can be vertically positioned within a given form factor.

Prior art magneto-optical flying heads that employ a polarization-maintaining fiber and Fabry-Perot (FP) laser to deliver polarized light from a source to a storage location are subject to significant mode partition noise that limits the available signal-to-noise ratio. Mode partition noise (MPN), in the form of broadband polarization fluctuations, is an intrinsic property of the FP laser that is manifest when a highly birefringent element is placed its optical path. Polarization-maintaining optical (PM) fiber is, by design, very birefringent; therefore, MPN is very difficult to eliminate when PM fiber is utilized with a FP laser.

What is needed, therefore, is an optical data storage system that utilizes optical fiber to convey light between a laser source and a storage location of an optical drive optical data storage system with sufficient signal-to-noise (SNR) and that allows an increase in the number of disks that can be placed within a given volume, as compared to the prior art. The improved optical head should preferably provide a high numerical aperture, a reduced head size and mass. Additionally, the optical head should improve upon prior art access to disk surfaces, disk drive access times, data transfer rates, optically induced noise, and ease of alignment and manufacture.

SUMMARY OF THE INVENTION

The present invention provides improvements over prior art optical disk drives. The improvements allow an increase in the number of storage disks that can be placed within any given volume. The improvements include the use of low-birefringence optical fibers to transfer information to and from optical storage media. The improvements further include a high resonance frequency tracking servo device on a reduced profile head which, in conjunction with the optical fibers provides improved access to storage media, improved disk drive access times, and improved data transfer rates.

The optical disk of the present invention also utilizes various aspects of Winchester magnetic disk technology, for example, flying head technology. In the present invention, a laser optics assembly directs light from an optical light source to an optical switch, which directs the light to one of a plurality of optical fibers coupled to one or more rotary arms, each of which support a flying optical head. Light is delivered through the optical fiber to a respective optical head for the purpose of reading and writing of data at a respective storage media with a focused optical spot. A reflected light signal from the storage media couples back through the optical head and optical fiber for subsequent processing. In one embodiment, the optical source of light comprises a Fabry Perot laser.

The optical path of the light delivered by the optical fiber is altered by a steerable micro-machined mirror. Track following and seeks to adjacent tracks are performed by rotating a central mirror portion of the mirror about an axis of rotation. A reflected light from the steerable micro-machined mirror is directed through an embedded micro-objective lens such as a GRIN (Gradient index) lens or a molded lens. A focused optical spot is scanned back and forth in a direction which is approximately parallel to the radial direction of the storage media. In another embodiment, track following and seeks to adjacent tracks may be performed with more than one storage media surface at a time by operating a set of steerable micro-machined mirrors independently from each other.

In the present invention, a further improvement includes information transfer to and from magneto-optical storage disks using low-birefringence optical fibers. Due to inevitable stresses that are applied to the optical fibers, the SNR ratio of polarization information from the storage media may be degraded when conveyed by the optical fibers. The present invention provides an apparatus and method for increasing the SNR. In one embodiment, in-plane bend induced birefringence in low birefringence optical fibers is compensated for to increase the SNR. In another embodiment, out-of-plane bend induced birefringence is compensated for to increase the SNR. In another embodiment, both in-plane bend induced and out-of-plane bend induced birefringence are compensated for to increase the SNR. Out-of-plane bend induced birefringence may be compensated for by providing an optical polarization rotation element, which may comprise a ½ wave plate or a combination of a fixed ¼ wave plate and a rotatable ¼ wave plate. In-plane bending may be compensated by providing optical phase retardation of the reflected light. Phase retardation may be provided by an optical phase retardation element comprising, a combination of a liquid crystal retarder and a fixed ½ wave plate, a combination of a fixed ¼ wave plate and a rotatable ½ wave plate, or a fixed ¼ wave plate and rotatable leaky beam splitter. In yet another embodiment, the SNR may be increased by providing an optical source of light comprising a modulated Fabry Perot laser.

BRIEF DESCRIPTION OF THE DRAWINGS

FIGS. 4a–g illustrate a flying head of the present invention in various views.

DETAILED DESCRIPTION OF THE INVENTION

Figure 1A:
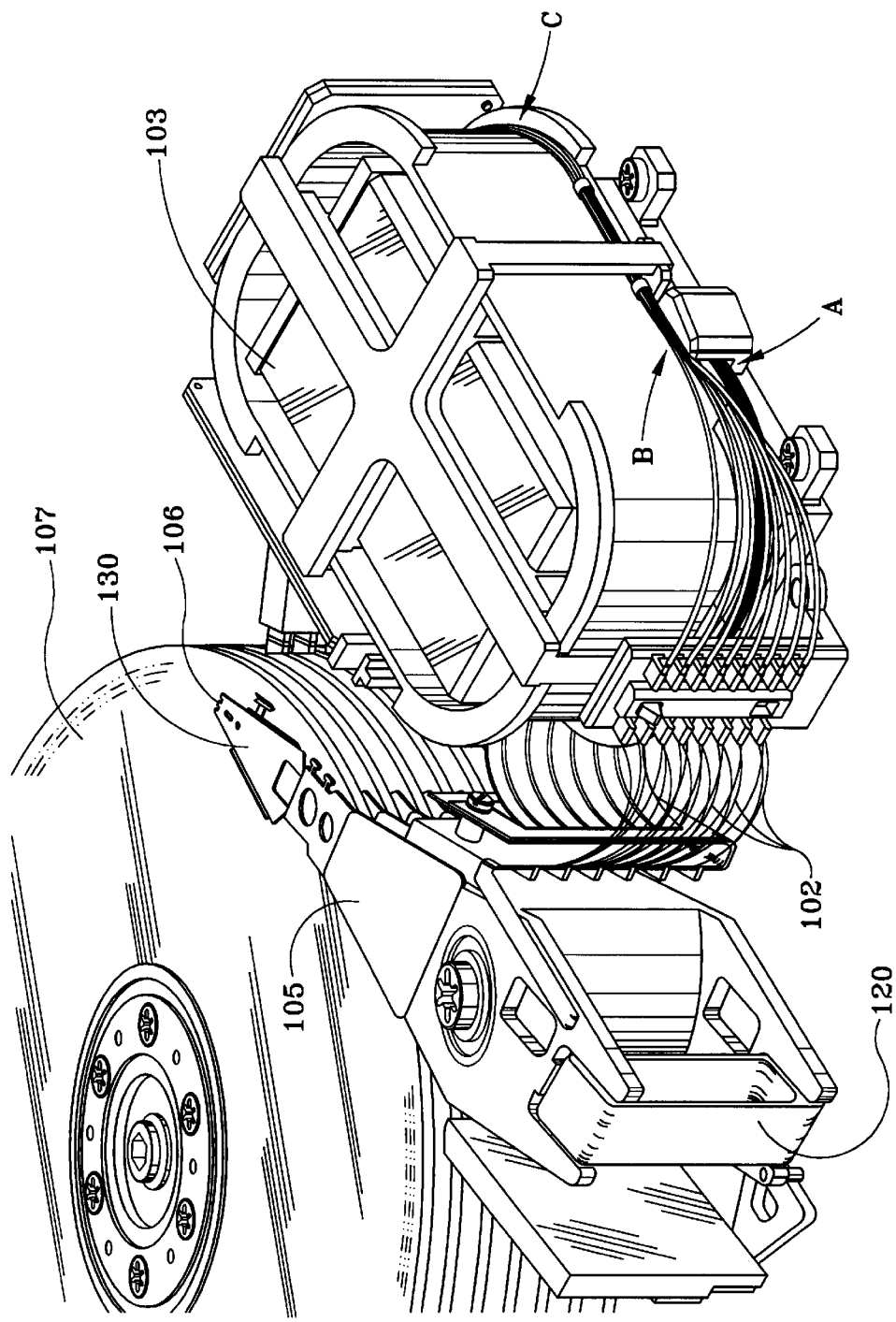
FIG. 1a illustrates one embodiment of magneto-optical storage and retrieval system with in-plane bending and out-of-plane bending of a low birefringence optical fiber.

Referring in detail now to the drawings wherein similar parts of the invention are identified by like reference numerals, there is seen in FIG. 1a a magneto-optical storage and retrieval system 100, generally illustrated in a perspective view. In a preferred embodiment, the magneto-optical (MO) data storage and retrieval system 100 includes a set of Winchester-type flying heads 106 that are adapted for use with a set of double-sided first surface MO disks 107 (one flying head for each MO disk surface). The set of flying heads 106 (hereinafter referred to as flying MO heads) are coupled to a rotary actuator magnet and coil assembly 120 by a respective suspension 130 and actuator arm 105 so as to be positioned over the surfaces of the set of MO disks 107. In operation, the set of MO disks 107 are rotated by a spindle motor so as to generate aerodynamic lift forces between the set of flying MO heads 106 and the set of MO disks 107 and so as to maintain the set of flying MO heads 106 in a flying condition approximately 15 micro-inches above the upper and lower surfaces of the set of MO disks 107. The lift forces are opposed by equal and opposite spring forces applied by the set of suspensions 130. During non-operation, the set of flying MO heads 106 are maintained statically in a storage condition away from the surfaces of the set of MO disks 107. System 100 further includes an optics module 103 and a set of low birefringence optical fibers 102 coupled thereto.

Figure 2A:
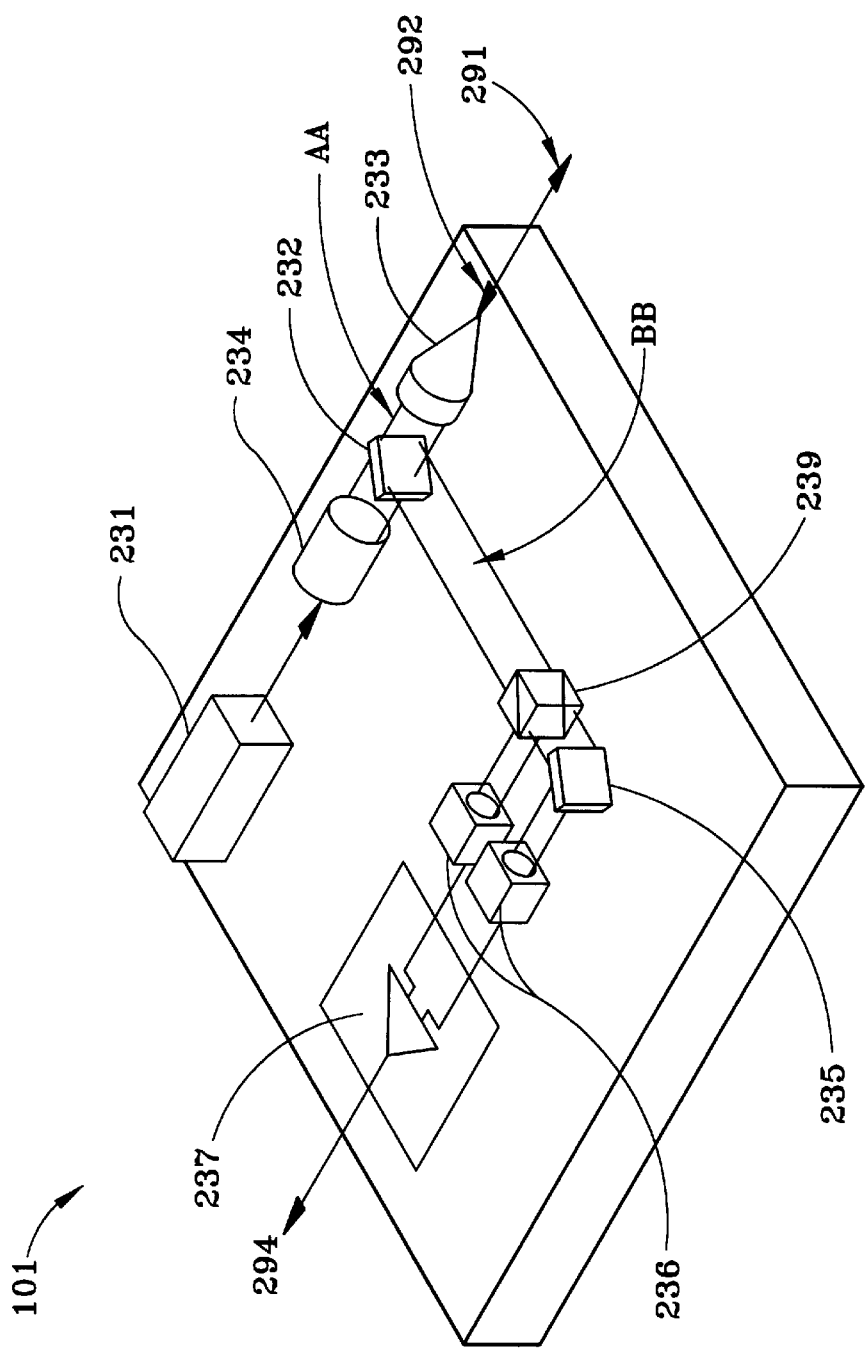
FIG. 2a illustrates a laser-optics assembly of the present invention.
Figure 2B:
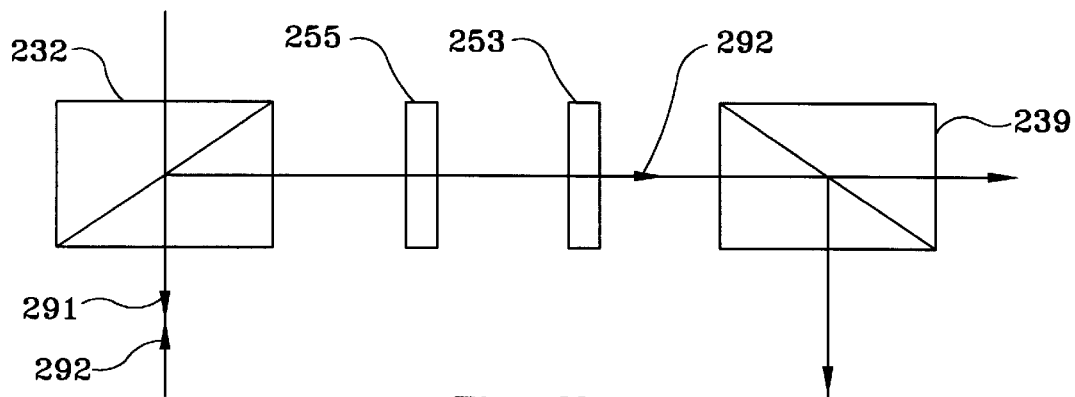
FIG. 2b illustrates one embodiment of an optical phase retarder.

FIG. 2b illustrates a laser-optics assembly 101 used as part of the laser optics module 103. In the present invention, the optics module 103 of FIGS. 1a and b comprises laser-optics assembly 101, which includes a Fabry Perot (FP) laser source 231 of a variety that is well known in the art. In an exemplary embodiment, the laser source 231 operates at a wavelength of approximately 660 nm within a red region of the visible light spectrum; however, it is understood that laser sources operating at other wavelengths are also within the scope of the present invention. Fabry-Perot laser diodes are characterized by high-frequency fluctuations in their spectral output, which is also referred to in the art as mode partition noise (MPN). In the prior art, when linearly polarized light is launched into a highly birefringent element, for example, a single-mode polarization-maintaining (PM) optical fiber, mode partition noise (MPN) is converted into polarization noise, which acts to reduce available signal-to-noise ratio (SNR). In MO recording, since polarization information from the MO disk 107 is desired to be read, it is important that polarization noise be kept to a minimum, which, however, is difficult to achieve when using the FP laser source and single-mode polarization-maintaining optical fiber of the prior art. The laser-optics assembly 101 further includes: collimating optics 234, a leaky beam splitter 232, and a coupling lens 233. The laser-optics assembly 101 directs a P polarized laser beam 291 from the laser source 231 through the leaky beam splitter 232 and coupling lens 233 towards the optical switch 104, The laser-optics assembly 101 also receives S and P polarization components of a reflected laser beam 292 from the surface of a particular MO disk 107. The reflected laser beam 292 is directed by the coupling lens 233 and is routed by the leaky beam splitter 232 towards a differential detector comprising: a polarizing beam splitter 239, a mirror 235, and a set of photo-diodes 236. After conversion by the set of photo-diodes 236, the differential signal is processed by the differential amplifier 237 and is output as signal 294. The differential detector measures the optical power of the orthogonal S and P polarization components of the reflected laser beam 292, with a differential signal being preferably a sensitive measure of polarization rotation induced by a Kerr effect at the surface of the particular MO disk 107. As will be discussed below, in particular embodiments of the present invention, the laser-optics assembly 101 may further include a variety of optical components at locations indicated at AA and BB to provide optical phase retardation and/or optical polarization rotation of the laser beams 291 and 292.

Figure 3:
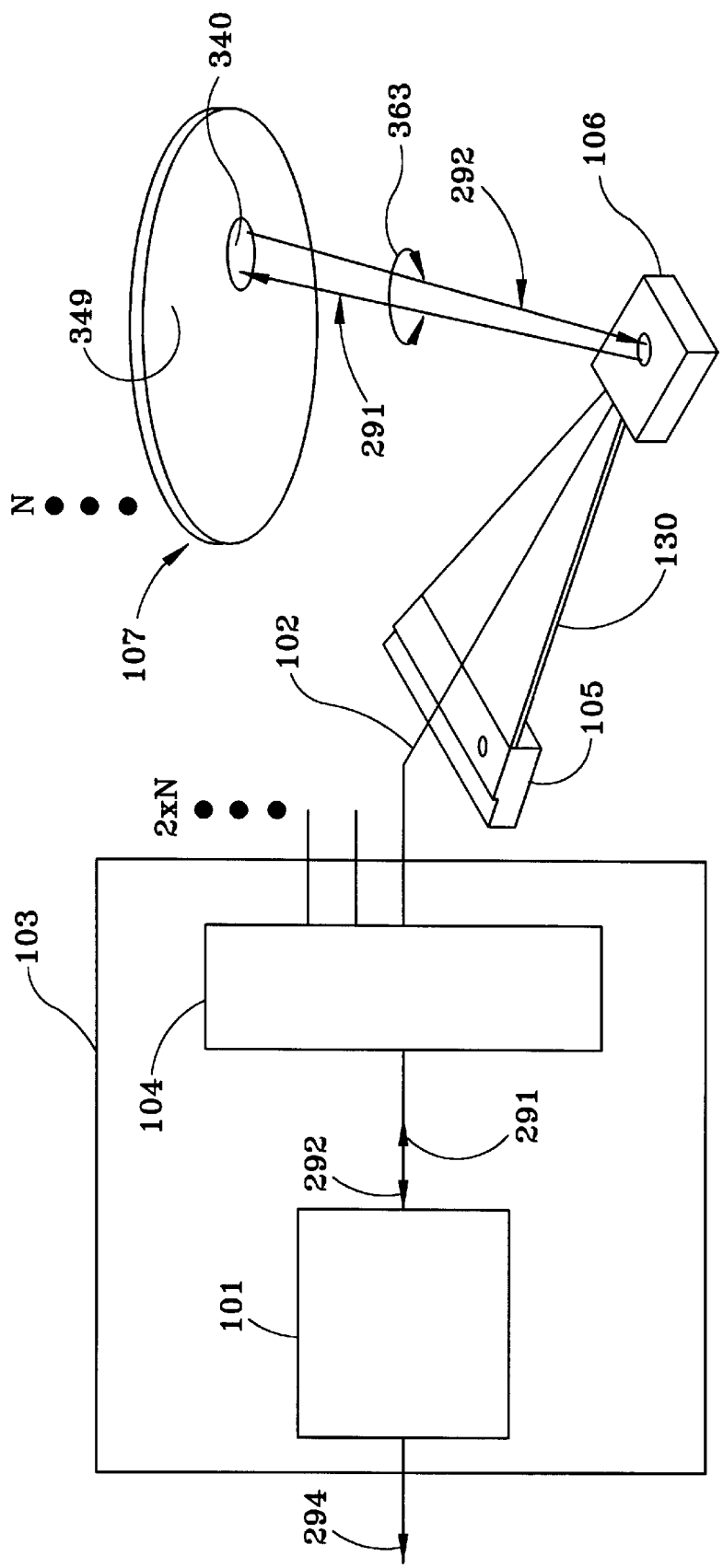
FIG. 3 illustrates an optics module comprising an optical switch.

FIG. 3 illustrates the optics module 103 comprising an optical switch 104. The optical switch 104 is disposed between the set of optical fibers 102 and the laser optics-assembly 101 and is shown in a representative optical path that includes one of the set of optical fibers 102, one of the set of flying MO heads 106, and one of the set of MO disks 107. The optical switch 104 provides sufficient degrees of selectivity so as to direct the outgoing laser beam 291 towards a respective proximal end of a particular optical fiber 102. The outgoing laser beam 291 exits a distal end of the optical fiber 102 and is directed through the flying MO head 106 onto a surface recording layer 349 of a respective MO disk 107.

During writing of information, the outgoing laser beam 291 lowers a coercivity of the surface recording layer 349 by heating a selected spot of interest 340 to approximately the Curie point of the MO recording layer 349. The optical intensity of outgoing laser beam 291 is held constant, while a time varying vertical bias magnetic field is used to define a pattern of "up" or "down" magnetic domains perpendicular to the MO disk 107. This technique is known as magnetic field modulation (MFM). Alternatively, outgoing laser beam 291 may be modulated in synchronization with the time varying vertical bias magnetic field at the spot of interest 340 in order to better control domain wall locations and reduce domain edge jitter. Subsequently, as the selected spot of interest 340 cools at the surface layer 349, information is encoded at the surface of the respective spinning disk 107.

During readout of information, the outgoing laser beam 291 (at a lower power compared to writing) is selectively routed to the MO disk 107 such that upon its reflection from the spot of interest 340 the Kerr effect causes a polarization state of the reflected laser beam 292 to be rotated either clockwise or counter clockwise (as indicated with arrow 363). The aforementioned optical path is bidirectional in nature. Accordingly, the reflected laser beam 292 is received through the flying MO head 106 and enters the distal end of the optical fiber 102. The reflected laser beam 292 is directed by the optical fiber 102 towards the optical switch 104 and is selectively routed by the optical switch 104 towards the laser-optics assembly 101 for subsequent optical-to-electrical signal conversion.

Referring back to FIG. 1a, in the preferred embodiment, the set of optical fibers 102 of the present invention comprises single-mode low-birefringence optical fibers. The present invention identifies that by using an optical fiber that is designed to have low birefringence, a fiber that is known in the optical fiber arts as low-birefringence or lo-bi optical fiber, mode partition noise may be reduced to achieve an acceptable SNR. The low birefringence of lo-bi optical fiber contrasts with the inherent high birefringence of single-mode polarization-maintaining optical fibers, also known as PM optical fiber. Lo-bi fiber can be provided as "spun fiber," which is spun from a slightly birefringent fiber preform during a fiber drawing process. Geometrical twisting is frozen into the spun fibers when cooled. If the fibers are spun sufficiently, the effects of bend induced linear birefringence due to the non circular cross section or the anisotropic thermal stress can be overwhelmed by the effective circular birefringence introduced by the spinning. Most optical fibers exhibit linear birefringence caused by geometry and internal stresses. Spun fibers are the exceptions. It is understood that the present invention need not be limited to lo-bi fibers that are spun, as lo-bi optical fibers manufactured using other means are also known in the art. In an exemplary embodiment of the present invention, the set of lo-bi optical fibers 102 comprises: a phase retardation of 1–2 degrees per meter, an operating wavelength of approximately 660 nm, a cutoff wavelength of 580–600 nm, a cladding diameter of approximately 80 um, a dual acrylate jacket with a diameter of 160–190 um, an operational temperature range of 0–70 degrees A, a mode field diameter of approximately 4.0 um, and a mode field ellipticity of less than 5%.

As illustrated in FIG. 1a, the set of lo-bi optical fibers 102 are coupled at the distal ends to respective ones of the set of flying MO heads 106, are routed along respective ones of the set of actuator arms 105 and set of suspensions 130, are routed around the optics module 103, and are coupled at the proximal ends to the optics module 103. Because of limitations imposed by a limited volume present in the system 100, the set of optical fibers 102 may require routing in other than a co-linear and/or a co-planar manner, which in turn may stress the optical fibers 102 and thus induce birefringence in the optical fibers 102. In the present invention, the optical fibers 102 exit the optic module 103 at illustrated point A and are grouped together and wound around the optics module 103. The extra windings provide extra fiber length to facilitate assembly and rework if necessary. The fibers are preferably routed in such a way that a majority of static bending occurs in a single plane (referred to hereafter as in-plane bending). An example of in-plane bending of the optical fibers 102 is illustrated at point C. In the present invention, at some point the fibers 102 fan out to their respective heads, for example starting at illustrated point B; thus, there may also be some out-of-plane bending between the optical fibers 102, which may alter the local orientation of the birefringence, but if the bend radius is kept sufficiently large, then the magnitude of the out-of-plane birefringence may be relatively small. Bend induced birefringence can be characterized by (1) a magnitude that is proportional to $(R_{fiber}/R_{bend})^2$ where $R_{fiber}$ is the fiber cladding radius and $R_{bend}$ is the bend radius, and (2) an orientation such that one axis is in the plane of bending and the other axis is perpendicular to the plane. Those skilled in the art will recognize that if not for the bending of the set of optical fibers 102, the outgoing and the reflected laser beams 291 and 292 would in theory experience the set of optical fibers 102 with low-birefringence, similar to a set of free space optical paths. The polarization rotation information conveyed by the set of optical fibers 102 may be degraded by the aforementioned bend induced birefringence in the set of lo-bi optical fibers 102. Accordingly, the present invention provides a method and apparatus for compensation thereof, including optical elements in the optical paths of the laser beams 291 and/or 292 to provide optical phase retardation and/or optical polarization rotation.

The present invention identifies that phase shifts are introduced between the outgoing laser beam 291 and reflected laser beam 292 by the bend induced birefringence of the set of optical fibers 102 and that the phase shifts may be compensated for by placing optical phase retardation elements in the optical path of the reflected beam 292 and that, furthermore, for detection of a Kerr rotation of the reflected laser beam 292 with a maximum SNR, the phase shift between the P polarized outgoing laser beam 291 and the reflected P and S polarized reflected laser beam 292 should be maintained 0 degrees modulo $\pi$. In the preferred embodiment, optical phase retardation is utilized to optimize the Kerr signal from the MO disk 107 by bringing the reflected laser beam 292 in the absence of the Kerr signal and the orthogonally polarized Kerr components in phase and, thus, to also minimize the mode partition noise induced by the set of optical fibers 102 by operating at the bottom of a noise fringe. Optical phase retardation can be provided by an optical phase retardation element which resolves a light wave into two orthogonal linear polarization components and produces a phase shift between them. Ideally, optical elements that provide optical retardation will not polarize, nor will they induce an intensity change in a light beam passing therethrough; they will simply change beam's polarization state. Elements that provide optical phase retardation can be of a fixed or variable variety and are typically available as birefringent, uniaxial materials having two different refractive indices. Such materials may comprise, for example, a uniaxial crystal, a quartz crystal, a mica, nematic liquid crystal, an electro-optic material, a polymer, to name a few.

The present invention identifies that to achieve these conditions, the bend induced axes of the set of optical fibers 102 should be aligned with the axes of the leaky beam splitter 232 such that the P polarization of the outgoing laser beam 291 will be rotated into the same plane and perpendicular to the in-plane bend induced axes of the set of optical fibers 102.

Figure 1B:
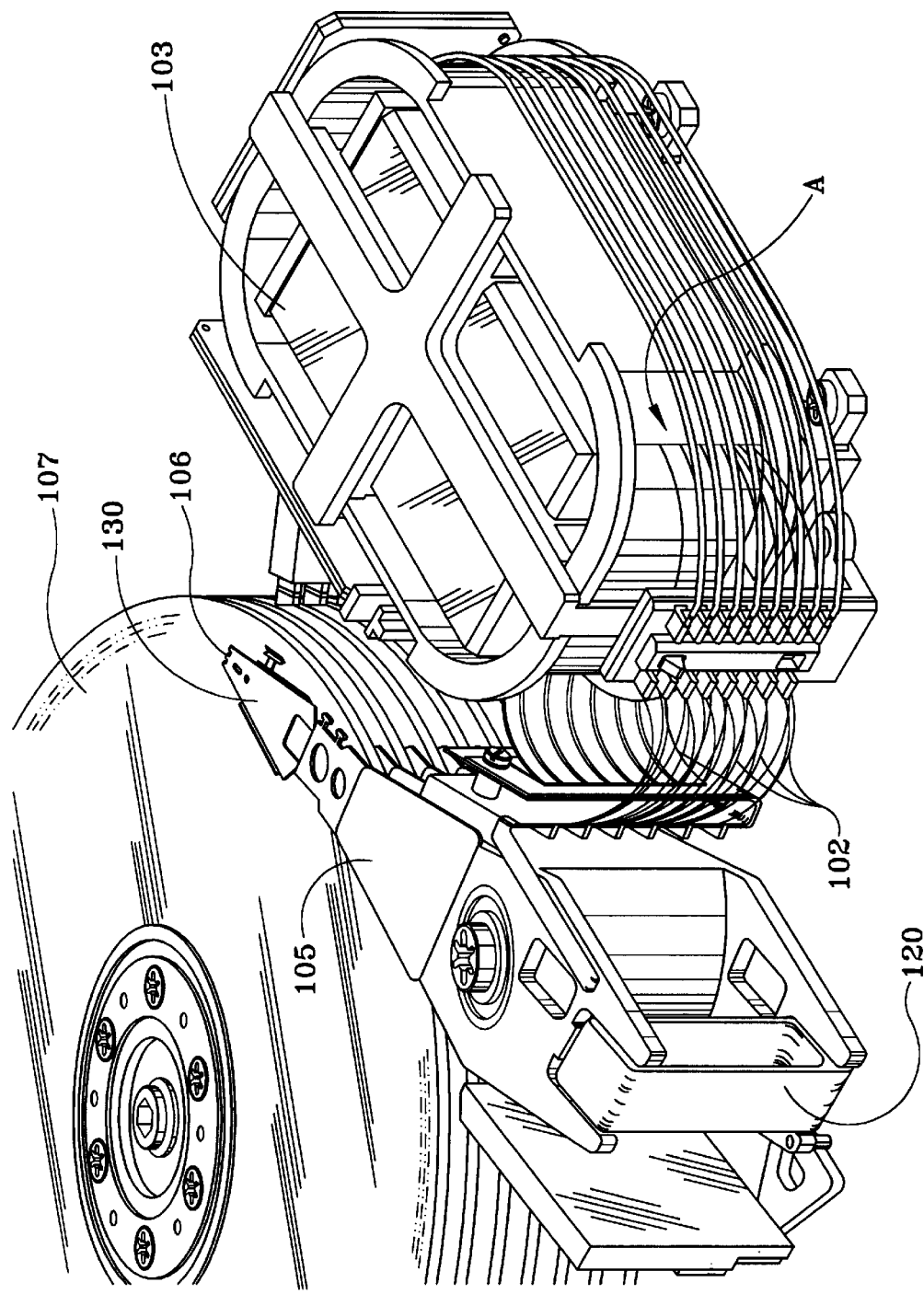
FIG. 1b iillustrates a magneto-optical storage and retrieval system with out-of-plane bending of a low birefringence optical fiber.

As discussed above, the set of optical fibers 102 may experience bending, for example, a combination of in-plane bending and/or out-of-plane bending. In another embodiment illustrated in FIG. 1b, it is possible that the optical fibers 102 be routed such that minimal out-of-plane bending of the set of optical fibers 102 occurs, for example, if the optical fibers 102 are routed to exit the optics module 103 and are maintained along parallel planes having a between plane spacing equivalent to a spacing between the respective heads 106 to which they are routed (rather than fanning out at point B). In this embodiment, even with no out-of-plane bending, in-plane bending of the fibers may still occur, such as during normal routing of the set of optical fibers 102 from the optics module 103 to the heads 106.

In one embodiment where minimal out-of-plane bending of the optical fibers 102 occurs, optical phase retardation may be provided by an optical phase retarder 255 comprising a variable liquid crystal retarder, such as an LVR 100 VIS manufactured by Meadowlark Optics, Frederick, Colo. 805030. In this embodiment, the optical phase retarder 255 is used in combination with a first ½ wave plate 253, both of which are disposed at point BB in the optical path between the leaky beam splitter 232 and the polarizing beam splitter 239 (illustrated in FIGS. 2a and 2b). Preferably the optical axes of the optical phase retarder 255 are aligned at zero degrees relative to the optical axes of the leaky beam splitter 232, and the optical axes of the first ½ wave plate 253 are aligned at 22.5 degrees relative to the axes of the leaky beam splitter 232. In an exemplary use of the variable liquid crystal retarder, an peak to peak input voltage of 1.53 volts is applied, which has been shown to produce adequate compensation for in-plane induced stresses; slight variations of in-plane bending between the set of optical fibers 102 may require slightly different voltages. The particular voltage to be applied when a particular optical fiber 102 is utilized may be predetermined during a calibration phase. The voltage may be changed during the intervals between switching of the optical switch 104.

Figure 2C:
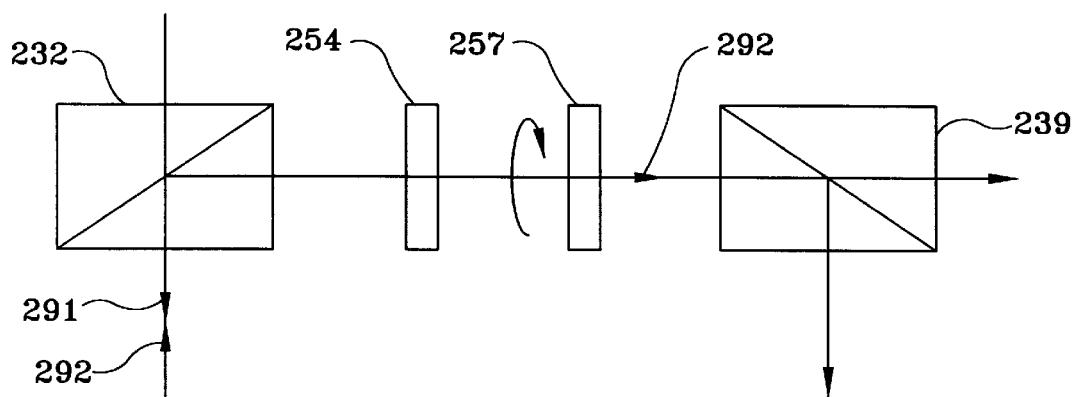
FIG. 2c illustrates another embodiment of an optical phase retarder.
Figure 2D:
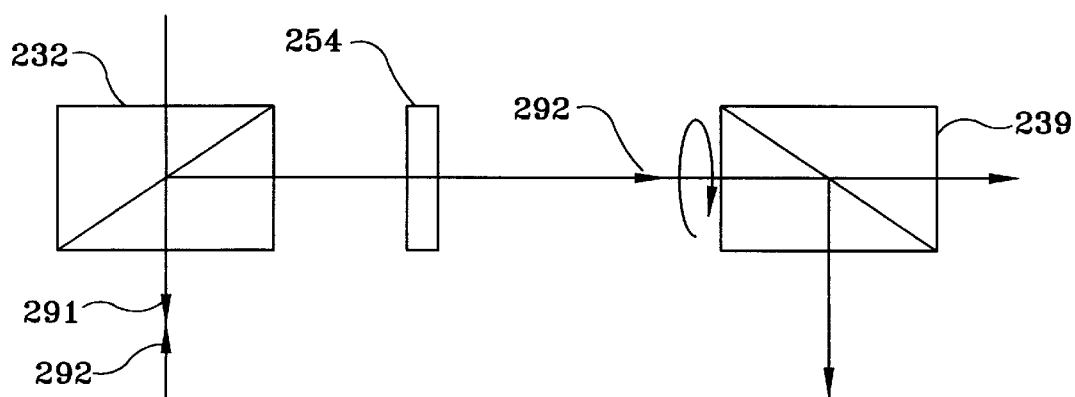
FIG. 2d illustrates another embodiment of an optical phase retarder.

In another embodiment where minimal out of plane bending of the optical fibers 102 occurs, optical phase retardation may be provided by a combination of a ¼ wave plate 254 of a variety well known in the art and a dynamically rotating ½ wave plate 257, both of which are disposed between the leaky beam splitter 232 and the polarizing beam splitter 239 (illustrated in FIGS. 2a and 2c). In this embodiment, the optical axes of the ¼ wave plate 254 are aligned at forty five degrees relative to the optical axes of the leaky beam splitter 232, and the optical axes of the dynamically rotating ½ wave plate 257 rotate relative to the axes of the leaky beam splitter 232. The dynamically rotating ½ wave plate 257 may comprise a ½ wave plate coupled to an electromechanical or electro-micro-machined actuator to enable a desired rotation of the ½ wave plate. The particular rotation to be applied to the ½ wave plate 257 when a particular optical fiber 102 is utilized may be predetermined during a calibration phase. The rotation may be applied during the intervals between switching of the optical switch 104.

In still another embodiment, optical phase retardation is provided by a ¼ wave plate 254, which is disposed between the leaky beam splitter 232 and the polarizing beam splitter 239, with the optical axes of the ¼ wave plate 254 preferably aligned at forty five degrees relative to the optical axes of the leaky beam splitter 239 (illustrated in FIGS. 2a and 2c). In this version, the polarizing beam splitter 239 is provided as a dynamically rotating polarization beam splitter. The dynamically rotating polarizing beam splitter may comprise a polarizing beam splitter coupled to an electromechanical or electro-micro-machined actuator that enables a desired rotation of the polarizing beam splitter. The particular rotation to be applied when a particular optical fiber 102 is utilized may be predetermined during a calibration phase and may be applied during the intervals between switching of the optical switch 104.

In the aforementioned embodiments, while static in-plane bend induced stress in low-birefringence optical fibers is compensated for, dynamic in-plane bend induced stress can be neglected as it is typically quite small, although it could in principle be compensated for as well with sufficiently fast compensation.

As discussed above, the bend induced axes of the set of optical fibers 102 are preferably aligned with the axes of the leaky beam splitter 232 such that P polarization of the outgoing laser beam 291 will be aligned with one of the bend induced axes of the set of optical fibers 102. This condition may be achieved by manually aligning the axes of the optical fibers 102 to each other and to those of the leaky beam splitter 232. In the event the axes of the optical fibers 102 and the leaky beam splitter 232 are not aligned, an optical polarization rotator 256 may be disposed at point AA between the coupling lens 233 and the leaky beam splitter 232 FIG. 2a. The optical polarization rotator 256 may comprise a second ½ wave plate of a variety well known in the art. In this embodiment, the optical axes of the optical fibers 102 are all pre-aligned to each other and the ½ wave plate is disposed to provide optical rotation of the p-polarization of the outgoing laser beam 291 into the plane of the bend induced axes of the set of lo-bi optical fibers 102.

Figure 2E:
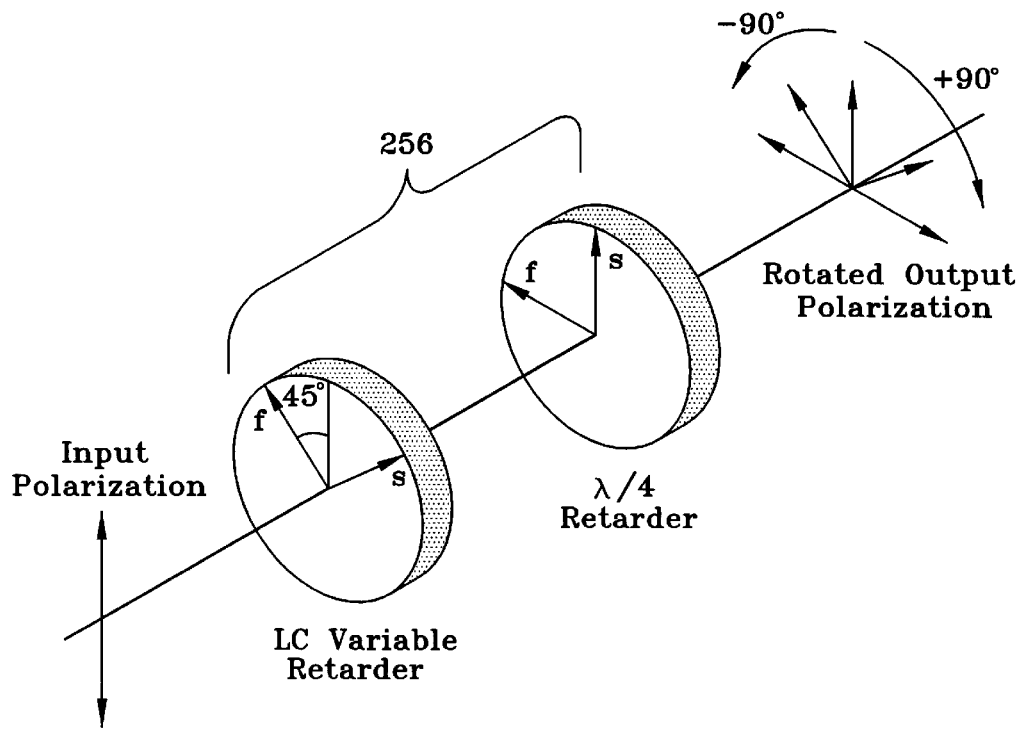
FIG. 2e illustrates an embodiment of an optical polarization rotator.

In the aforementioned embodiment of FIG. 1a, the set of optical fibers 102 are each routed around the optics module 103 to respective flying optical heads 106. Routing of the optical fibers 102 to the spaced apart heads 106 causes each optical fiber to traverse a slightly different path and, thus, experience different out-of-plane bending relative to exit point A. The out-of-plane bends cause each lo-bi optical fiber 102 to comprise bend induced axes that vary slightly in orientation relative to one another and/or with the leaky beam splitter 232. The variations between the out-of-plane bend induced axes of each optical fiber 102 can be accommodated for by using an optical polarization rotator 256 that is dynamically adjustable to rotate linear polarization of the outgoing laser beam 291, for example, by a ¼ wave plate retarder of a variety well known in the art coupled at 45 degrees relative to the axes of a second variable liquid crystal retarder (illustrated in FIG. 2e). Polarization rotation is achieved by electrically controlling the retardence of the variable liquid crystal. A variable optical polarization rotator as described above is available as an LPR 100 660, which is manufactured by Meadowlark Optics, Frederick, Colo., 805030. The optical polarization rotator 256 may also be enabled through mechanical actuation of rotation. The amount of polarization rotation necessary for alignment to the induced axes of each optical fiber 102 can be determined during a calibration step such that, in operation, when switching between optical fibers 102 occurs, a control voltage corresponding to the particular optical fiber 102 being used is applied to the optical polarization rotator 256 in a feed-forward fashion to provide the required polarization rotation.

Without the aforementioned in-plane bending of the optical fibers 102, such as in an embodiment where the optical path traversed by the optical fibers 102 is maintained with minimal bending, it is understood that the optical phase retardation would not necessarily be required. Without the aforementioned out-of-plane bending of the optical fibers 102, such as in an embodiment in which only a single lo-bi fiber 102 is used to convey information to a single MO disk 107, it is understood that optical polarization rotation would not necessarily be required. In other embodiments, where both in-plane and out-of-plane bending is present, both optical phase retardation and the optical polarization rotation may be required. It should be apparent, therefore, that the present invention should not be limited to the embodiments discussed above but only the scope of the ensuing claims.

Figure 2F:
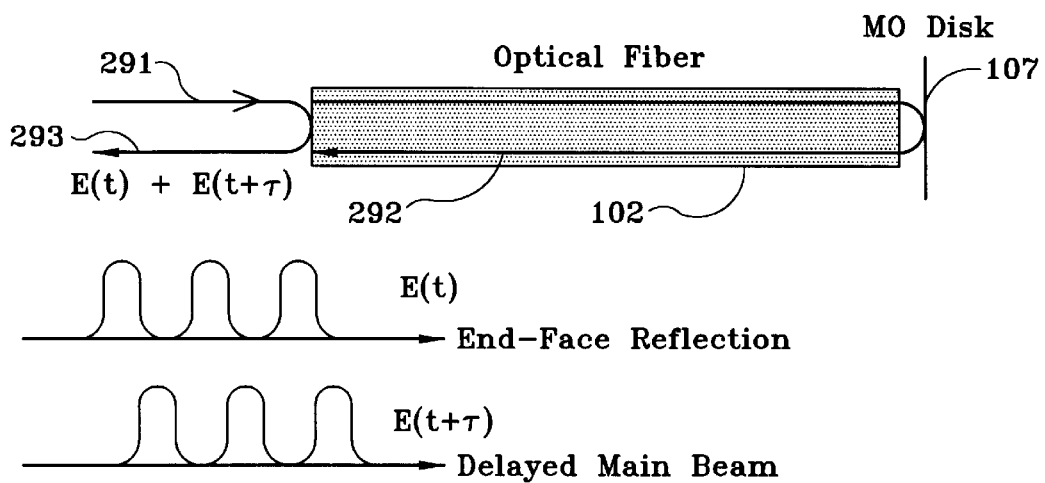
FIG. 2f illustrates an embodiment in which a Fabry Perot laser is pulsed.

In a fourth embodiment illustrated in FIG. 2f, it has been identified that spurious reflection from the proximal ends of the set of optical fibers 102 may degrade SNR, whereby the reflected beam 292 may contain a component of a reflection of the beam 291 from the proximal ends, thereby resulting in a reflected beam 293 comprising $E(t)+E(t+\tau)$. In such a case, the present invention may include a FP laser source 231 that is pulsed on and off with a duty cycle of 50% or less and with a modulation frequency of approximately 350 MHz. Pulsing of the laser 231 allows the reflected pulses of the beam 292 to be time separated from the beam 291 thereby reducing interference between the two pulse trains and thus effectively increasing the SNR of the detected Kerr signal. In an exemplary embodiment, with an optical fiber 102 index of refraction of 1.5, the length of each of the optical fibers 102 is selected to be about 71.35 mm. The relationship between the modulation frequency (F) and the length (L) of the optical fibers 102 is embodied in the equation: $F=c(2i+1)/4Ln$ $i=0,1,2,\ldots$ where c=speed of light, n=refractive index of the fiber. The length of the set of optical fibers 102 is selected to ensure a proper time separation of the pulses trains. It is understood that in other embodiments, the length of the optical fiber 102 can be selected in accordance with other indices of refraction and other pulsing frequencies and, thus, the present invention should be limited only by the scope of the claims. Although the present invention describes use of low birefringence optical fibers, it is understood that pulsing of the laser and selecting an appropriate optical fiber length as described in the fourth embodiment may also be used to increase SNR in an embodiment utilizing high birefringence optical fibers (i.e., polarization maintaining optical fiber).

FIGS. 4a–g illustrate a magneto-optical head of the present invention in various views. The set of flying MO heads may be illustrated with reference to a single representative flying MO head 106. A single representative flying MO head 106 is shown in FIG. 4b to be positioned respectively above a surface recording layer 349 of one of the set of spinning MO disks 107. In a preferred embodiment, the flying MO head 106 includes: a body 444, an air bearing surface 447, a steerable micro-machined mirror assembly 400, an objective optics 446, and a magnetic coil 460 In an exemplary embodiment, the magnetic coil 460 is a micro multi-turn coil positioned near the air-bearing surface 447 so as to generate a magnetic field that is: approximately 300 Oersteds of either polarity, reversible in a time of about 4 ns, and approximately perpendicular to the plane of the spinning MO disk 107. The steerable micro-machined mirror assembly 400 is described in commonly assigned U.S. patent application Ser. No. 08/844,207, which incorporated herein by reference. Preferably, the magnetic coil should not interfere with the outgoing and reflected laser beams 291 and 292 during passage through the flying MO head 106 to the spinning MO disk 107, or vice versa. As determined by mechanical dimensions and/or optical properties of the aforementioned elements comprising the flying MO head 106, the body 444 includes a height of approximately 889 um and a planar footprint area that corresponds to that of 2032 um×1600 um. The low-birefringence optical fiber 102 is preferably coupled to the flying MO head 106 and is held along an axis of the body 444 by a v-groove 443 or other suitably dimensioned channel. The optical fiber 102 is positioned within the v-groove 443 to preferably direct the outgoing laser beam 291 as an optimally focused spot of interest 340 onto the MO disk 107. The optical fiber 102 may be subsequently secured in place by using an ultraviolet curing epoxy or a similar adhesive. Use of the optical fiber 102 within a V-groove permits accurate alignment and delivery of the outgoing laser beam 291 relative to the small mirror assembly 400. The steerable micro-machined mirror assembly 400 and objective optics 446 are preferably compact and low mass so as to fit within a physical volume defined approximately the rectangular outer dimensions of the body 444 and yet sufficiently large to direct a full cross section of the outgoing and reflected laser beams 291 and 292 so that minimal power is lost and significant distortion and aberrations in the outgoing and reflected laser beams 291 and 292 are not introduced. The MO head 106 profile, weight, and design are further simplified through the use of the low-birefringence optical fibers 102 of the present invention, in that, a ¼ wave plate is not required as an additional optical component for use on the flying MO head 106 as is required when using the polarization-maintaining optical fibers of the prior art.

The steerable micro-machined mirror assembly 400 is preferably aligned in the representative optical path so as to direct the outgoing laser beam 291 through the objective optics 446 towards the MO disk 107 and so as to direct the reflected laser beam 292 from the MO disk 107 back to the laser optics assembly 101. In one embodiment, the objective optics 446 may be a microlens with a numerical aperture (NA) of approximately 0.67. Because flying height above the air bearing surface 447 is maintained with a constant value, a focusing servo is not necessarily required.

As used in the magneto-optical storage and retrieval system 100, fine tracking and short seeks to nearby tracks are performed by rotating a reflective central mirror portion 420 (shown as hidden by dotted lines in FIG. 4a) of the steerable micro-machined mirror assembly 400 about a rotation axis constrained by a set of hinges 410 such that the propagation angle of the outgoing laser beam 291 is changed before transmission to the objective optics 446. The reflective central mirror portion 420 is rotated about axes formed by the hinges 410 by applying a differential voltage to drive electrodes. The differential voltage creates an electrostatic force that enables the focused spot of interest 340 to be moved in the radial direction 450 on the MO media 107. In an exemplary embodiment, the central mirror portion 420 rotates approximately +/−2 degrees, which is equivalent to approximately +/−4 tracks at the surface of the MO disk 107. Although, in the exemplary embodiment a movement of +/−4 tracks is disclosed, depending on the desired performance characteristics of the steerable micro-machined mirror 400 described above, a range of movement greater or fewer than +/−4 tracks is understood to also be possible. Consequently, movement of the focused spot of interest 340 across the MO disk 107 and detection of the reflected laser beam 292 may be used in storage and retrieval of information, track following, and seeks from one data track to another data track. Coarse tracking may be maintained by adjusting a current to rotary actuator magnet and coil assembly 120 (FIG. 1a). The track following signals used to follow a particular track of the MO disk 107 may be derived using combined coarse and fine tracking servo techniques that are well known in the art. For example, a sampled sector servo format may be used to define tracks. The servo format may include either embossed pits stamped into the MO disk 107 or magnetic domain orientations that are read similar to data marks. If embossed pits are used, an adder output circuit may be used to supplement the differential amplifier 237 (FIG. 2). Those skilled in the art will recognize that conventional prior art multiple magnetic disk Winchester magnetic disk drives use a set of respective suspensions and actuator arms that move in tandem as one integral unit. Therefore, because each flying head of such an integral unit is fixed relative to another flying head, during track following of a particular magnetic disk surface, simultaneous track following of another magnetic disk surface is not possible. In contrast, irrespective of the movement of the set of actuator arms 105 and set of suspensions 130, a set of steerable micro-machined mirror assemblies 400 may be used to operate independently and thus permit track following and seeks so as to read and/or write information using more than one MO disk surface at any given time. Independent track following and seeks using the set of concurrently operating steerable micro-machined assemblies 400 would preferably require a set of separate respective read channel and fine track electronics and mirror driving electronics. Because the aforementioned embodiment would also preferably require use of separate laser-optics assemblies 101, an optical switch 104 for switching between each of the separate optical paths would not necessarily be required.

Figure 5A:
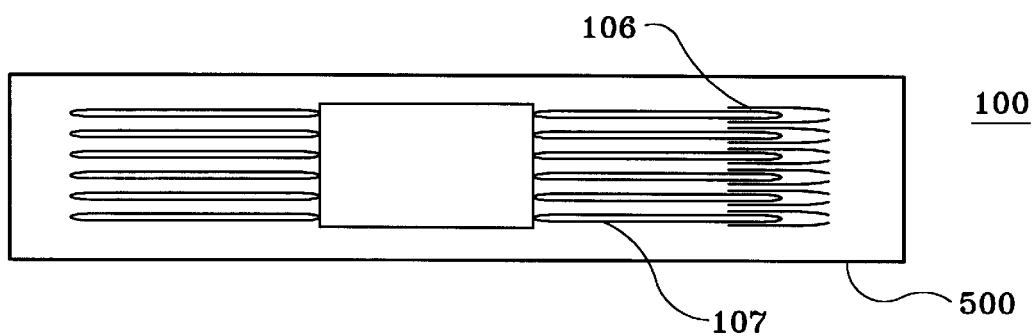
FIGS. 5a–b illustrate two embodiments of a magneto-optical disk drive.

FIG. 5a illustrates a magneto-optical data storage and retrieval system as part of a magneto-optical disk drive. In a preferred embodiment, the magneto-optical system 100 comprises a compact high-speed and high-capacity MO disk drive 500 that includes an industry standard 5.25 inch half-height form factor (1.625 inch), at least six double-sided MO disks 107, and at least twelve flying MO heads 106. As discussed above, the flying MO heads 106 may be manufactured to include optical fibers 102 as part of a very small mass and low profile high NA optical system so as to enable utilization of multiple MO disks 107 at a very close spacing within the MO disk drive 500 and; therefore, to comprise a higher areal and volumetric and storage capacity than is permitted in an equivalent volume of the prior art. In the preferred embodiment, a spacing between each of the MO disks 107 is less than or equal to 0.182 inches. The present invention identifies that a polarization state may be conveyed by low birefringence optical fibers 102 with reduced noise over that when conveyed by polarization-maintaining optical fiber.

Figure 5B:
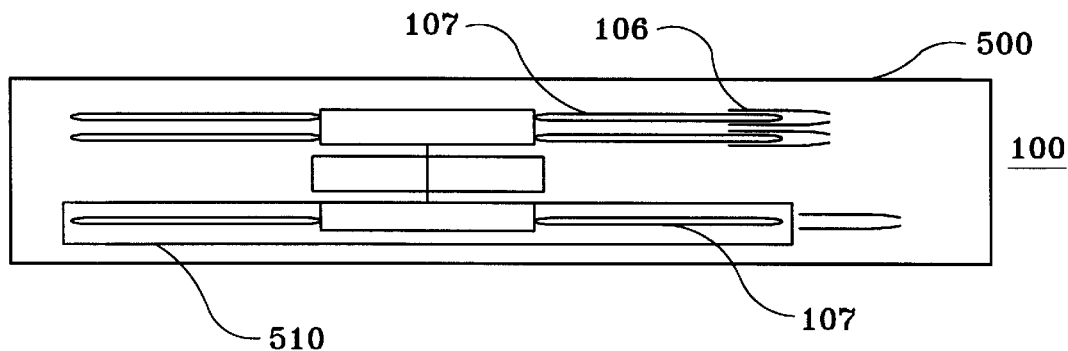

In an alternative embodiment shown in FIG. 5b, the half-height form factor MO disk drive 500 may include a removable MO disk cartridge portion 510 and two fixed internal MO disks 107. By providing the removable MO disk cartridge portion 510, the fixed internal and removable combination permits external information to be efficiently delivered to the MO disk drive 500 for subsequent transfer to the internal MO disks 107. The copied information may, subsequently, be recorded back onto the removable MO disk cartridge portion 510 for distribution to other computer systems. In addition, the removable MO disk cartridge portion 510 allows for very convenient and high speed back-up storage of the internal MO spinning disks 107. The fixed internal and removable combination also permits storage of data files on the removable MO disk cartridge portion 510 and system files and software applications on the internal MO spinning disks 107. In another alternative embodiment (not shown) an MO disk drive 500 may include: any number (including zero) of internal MO disks 107 and/or any number of MO disks 107 within any number of removable MO disk cartridge portions.

The present invention does not necessarily require use of rotary actuator arms, for example, linear actuator arms may be used. The low profile optical paths disclosed by the present invention may be used to convey information to and from a storage location without requiring objective optics (e.g., using a tapered optical fiber or an optical fiber with a lens formed on an end); and/or reflective substrates (e.g., using a curved optical fiber to convey information along surfaces of the magneto-optical head 106).

It is understood that the present invention can find utility in a variety of environments, such as other types of optical drives, communications systems, and the like. Therefore, although the present invention has been described herein with reference to particular embodiments thereof, a latitude of modification, various changes and substitutions are intended in the foregoing disclosure, and it will be appreciated that in some instances some features of the invention will be employed without a corresponding use of other features without departure from the scope of the invention as set forth.

We claim:

1. A system comprising an optical fiber exhibiting a low-birefringence when in an unstressed condition, wherein said optical fiber is disposed to convey a beam of light along an optical path between a source comprising an optical head adapted to fly over the surface of a magneto-optical disk, and a storage location on the optical disk, and wherein an optical phase retarder is disposed in said optical path to compensate for in plane bend induced birefringence to increase the SNR of polarization information of said optical fiber, the optical phase retarder being chosen from a group comprising, a rotating ½ wave plate in combination with a static ¼ wave plate; a liquid crystal retarder and a fixed ½ wave plate; or a fixed ¼ wave plate and a rotatable leaky beam splitter.

2. A system comprising an optical fiber exhibiting a low-birefringence when in an unstressed condition, wherein said optical fiber is disposed to convey a beam of light along an optical path between a source comprising an optical head adapted to fly over the surface of a magneto-optical disk, and a storage location on the optical disk, the beam of light is directed between said storage location and said at least one optical fiber by a steerable micro-machined mirror, and an optical polarization rotator is disposed in said optical path to compensate for out of plate induced birefringence to increase the SNR of polarization information of said optical fiber, wherein the optical polarization rotator is chosen from the group comprising a ¼ wave plate and a liquid crystal cell; or, a fixed ¼ wave plate and a rotatable ¼ wave plate.

3. A system as claimed in claim 2 wherein the optical polarization rotator comprises a ½ wave plate.

* * * * *

UNITED STATES PATENT AND TRADEMARK OFFICE
CERTIFICATE OF CORRECTION

PATENT NO. : 6,298,027 B1
DATED : October 2, 2001
INVENTOR(S) : Jeffrey P. Wilde et al.

It is certified that error appears in the above-identified patent and that said Letters Patent is hereby corrected as shown below:

<u>Title page,</u>
Item [56], References Cited, OTHER PUBLICATIONS, "Opsasnick et al." reference, "Sotrage" should read -- Storage --.

<u>Column 3,</u>
Line 59, "*i*ilustrates" should read -- illustrates --.

<u>Column 5,</u>
Line 2, "104," should read -- 104. --.

Signed and Sealed this

Thirteenth Day of July, 2004

JON W. DUDAS
*Acting Director of the United States Patent and Trademark Office*